Dec. 7, 1971   M. M. OSTEEN ET AL   3,624,963
SEAL DEVICE
Filed April 6, 1970
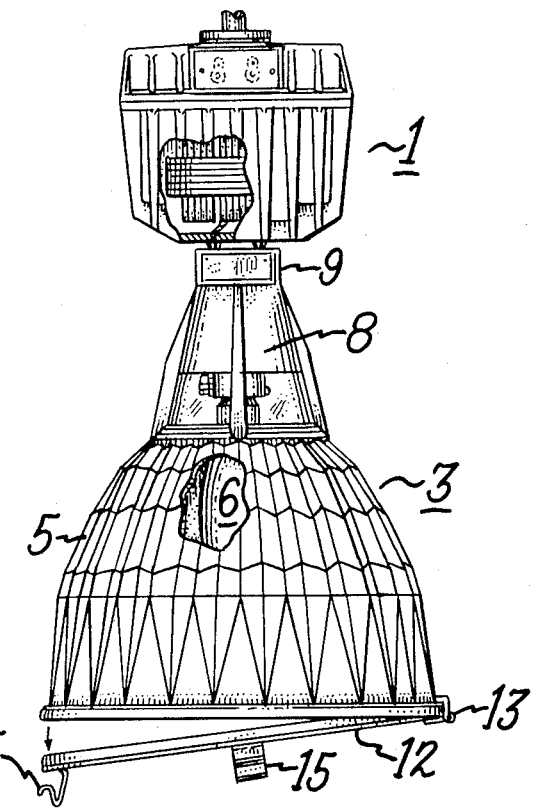
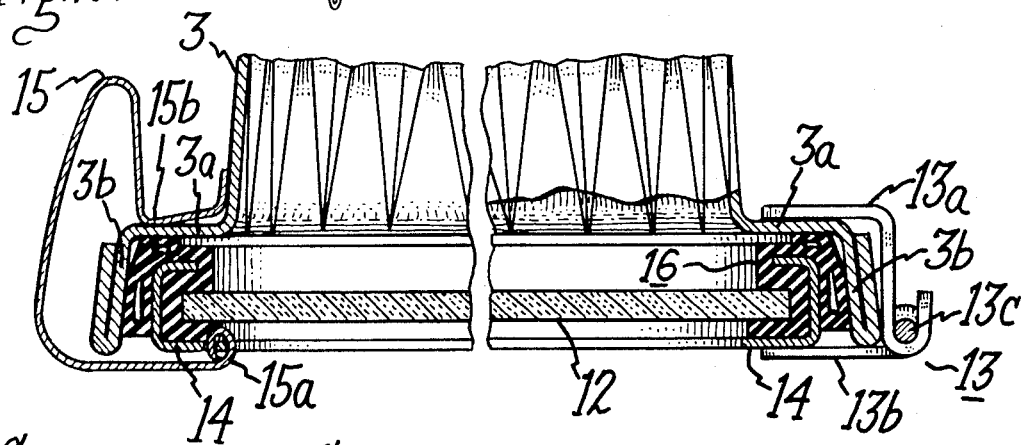
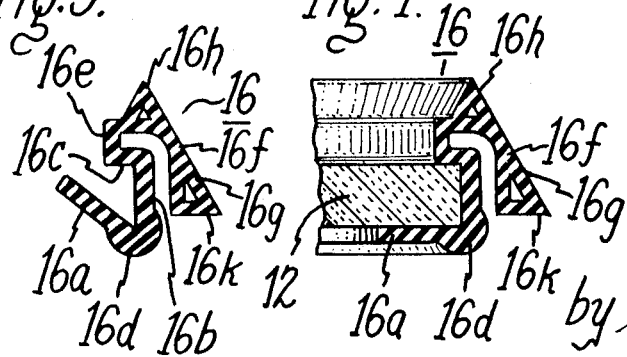
Inventors,
Mitchell M. Osteen,
James L. Grindle,
by Sidney Greenberg
Their Attorney.

United States Patent Office 3,624,963
Patented Dec. 7, 1971

3,624,963
SEAL DEVICE
Mitchell M. Osteen, Zirconia, and James L. Grindle, Hendersonville, N.C., assignors to General Electric Company
Filed Apr. 6, 1970, Ser. No. 25,996
Int. Cl. E05b 65/06
U.S. Cl. 49—394
10 Claims

ABSTRACT OF THE DISCLOSURE

Seal for hinged glass cover for reflector of luminaire comprises an annular resilient gasket having an inner grooved mounting portion for embracing the edge of the glass cover, an intermediate recessed portion in which the frame of the glass cover is received, and the outer sealing portion sloping downwardly and outwardly from the cover frame and having wedge-shaped compressible portions at top and bottom which co-act with the flanged rim of the reflector in the closed position of the cover for tightly sealing the cover to the reflector rim.

---

The present invention relates to sealing devices, and more particularly concerns a gasket arrangement for sealing the joint in a closure, such as glass covers for luminaires.

It is an object of the invention to provide an improved sealing gasket for closures of the above type.

It is a particular object of the invention to provide an improved sealing arrangement for the hinged door glass of luminaires and a novel gasket therefor, whereby the door glass in closed position covering the luminaire reflector opening is in tight sealing relation with the reflector.

Other objects and advantages will become apparent from the following description and the appended claims.

With the above objects in view, the present invention in one of its aspects relates to a closure sealing arrangement comprising, in combination, housing means such as a reflector having an annular rim defining an opening, and a closure member fitting within the rim in closed position covering the opening, the rim flaring outwardly at a predetermined angle from the axis of the opening, and an annular sealing gasket arranged between the periphery of the closure member and the rim, the gasket being of compressible resilient material and being integrally formed on an inner portion in sealing engagement with the periphery of the closure member and an outer portion sloping outwardly at a greater angle than the predetermined angle and having at its outermost region a diameter larger than the inner diameter of the rim, whereby the gasket is radially compressed by engagement with the rim for forming an air-tight seal therewith.

The invention will be better understood from the following descripiton taken in conjunction with the accompanying drawing, in which:

FIG. 1 is a view in elevation of a lighting fixture incorporating a sealing gasket arrangement for a hinged door glass in accordance with the invention;

FIG. 2 is an enlarged view in cross-section of the sealing gasket arrangement with the door glass in closed position;

FIG. 3 is a cross-sectional view of the sealing gasket per se of the invention prior to installation on the door glass; and FIG. 4 is a fragmentary view, partly in section, of the sealing gasket mounted on the door glass prior to assembly of the door frame thereon.

Referring now to the drawing, and particularly to FIG. 1, there is shown a luminaire of industrial type in which the sealing arrangement of the invention may be embodied and which comprises ballast housing 1 having suspended therefrom an optical assembly 3 comprising a reflector 5 having a lamp 6 mounted therein. The housing constituted by reflector 5 of optical assembly 3, together with socket housing 8 at its top and hinged door glass 12 at its bottom, forms a closed optical enclosure which communicates with the atmosphere only through an air filter (not shown) arranged in a separable connector housing 9 between ballast housing 1 and socket housing 8. This structure and function thereof are fully disclosed in copending application of Osteen, Ser. No. 23,912, filed Mar. 30, 1970, and assigned to the same assignee as the present invention.

The present invention relates particularly to the sealing arrangement between door blass 12 and the bottom of reflector 3 by which an effective air-tight seal is provided when the door glass is closed. As seen in FIG. 2, the bottom rim of reflective housing 3 is formed of a lateral flange portion 3a and a peripheral skirt portion 3b extending downwardly and outwardly therefrom. Glass door 12 is hingedly connected at one side to reflector 3 by hinge 13 to permit the door to be opened, as seen in FIG. 1, for access to the interior of the optical enclosure for relamping or other purposes. Hinge 13 comprises an upper hinge plate 13a secured to the top of flange 3a, a lower hinge plate 13b secured to the bottom of door frame 14, and hinge pin 13c pivotally interconnecting the hinge plates. A plurality of resilient latches or clamps 15, of spring steel or the like, circumferentially spaced on door frame 14 serve to detachably hold door glass 12 in closed position covering the opening of reflector 3. As seen in FIG. 2, each clamp 15 is pivotally connected to the bottom flange of channel-shaped frame 14 by means of a curved portion 15a which is received in a slot in the frame as shown, and has a flange 15b which resiliently bears on the top of reflector rim 3a for clamping door glass 12 in closed position on reflector 3.

In accordance with the invention, an improved sealing gasket 16 is provided for door glass 12, the gasket being annular and integrally formed with portions respectively arranged between door glass 12 and frame 14, between frame 14 and flange 3a, and between frame 14 and skirt 3b. In the embodiment illustrated in FIG. 3, gasket 16, typically composed of a resilient material such as rubber or other elastomeric material, has a generally S-shaped inner portion formed with a bottom wall 16a, intermediate wall 16b and inner wall 16c which in combination define a channel for receiving the peripheral edge of door glass 12 in sealing engagement. The outer corner of gasket 16 at the junction of the walls 16a, 16b is thickened or enlarged to provide a reinforcing portion 16d. The normal form of the gasket prior to installation on the door glass is such, as shown in FIG. 3, that bottom wall 16a forms an acute angle with intermediate wall 16b. Such an arrangement, coupled with the reinforcing portion 16d, serves to maintain the gasket in a shape which urges it into a tight fit with the glass, as shown in the assembly of FIG. 4.

Integrally joined with the described S-shaped inner gasket portion at its top is an outer gasket portion 16f which has an outer sealing surface 16g sloping downwardly and outwardly at an angle to the vertical and which defines at its inner surface in combination with walls 16b, 16c and 16e a curved channel for receiving the upper portion of door frame 14 in sealing engagement therewith, as seen in FIG. 2. Outer gasket portion 16f is further formed with an upper wedge portion 16h at its top and a lower wedge portion 16k at its bottom. The wedge portions are shown as hollow, and they are readily compressible while having good mechanical strength. However, the gasket material may itself be of sufficiently compressible nature that the wedge portions 16h and 16k may be solid if desired, rather than hollow.

In the fully assembled condition as seen in FIG. 2, gasket 16 embraces the periphery of glass panel 12 and channel-shaped frame or clamp band 14 is clamped around the periphery of glass panel 12 with gasket 16 interposed therebetween. In such assembly, outer gasket portion 16f extends around the top and outer side of frame 14, with the peak of its upper wedge portion 16h projecting upwardly from the top of the frame and the peak of its lower wedge portion 16k directed laterally away from the side of the frame.

As seen in FIG. 2, reflector skirt 3b flares outwardly somewhat as it extends downwardly from reflector flange 3a. The angle which the inner surface of skirt 3b makes relative to the vertical, i.e., relative to the axis of the reflector opening, is somewhat smaller than the angle which sloped gasket surface 16g makes relative to the vertical. In an illustrative case, the angle of skirt 3b is about 10° to the vertical while the angle of the gasket surface 16g is about 30° to the vertical. The dimensions of the parts are such that the diameter of gasket 16 in the assembly is somewhat less at its upper portion than the inside diameter of skirt 3b at its upper portion, while the outer diameter of gasket 16 at its lower portion is somewhat larger than the inside diameter of skirt 3b at its lower portion.

By virtue of the described arrangement, outer gasket portion 16f engages the inner surface of reflector skirt 3b with a sliding, wedging action as door glass 12 is moved into closed position, and such action provides substantial radial pressure on the gasket portion 16f when the door is fully closed so as to ensure a tight seal between reflector skirt 3b and the gasket. In such fully closed position, upper wedge portion 16h is compressed between the underside of reflector flange 3a and door frame 14 and thus provides a tight seal between those parts. There is accordingly provided in the described arrangement a double seal in the space between door glass 12 and the reflector rim. Pressure exerted by spring metal latches 15 in operative position as shown in FIG. 2 maintains the parts in the thus sealed relation, until the latches are detached to allow the door to swing open. Vertical pressure thus exerted by latches 15 on the gasket is magnified by the mechanical advantage of the described wedging action between the gasket portion 16f and reflector skirt 3b. Effective sealing is thereby provided over prolonged operational life when the door glass is opened and closed a number of times for necessary access to the interior of the luminaire optical assembly.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Closure sealing arrangement comprising, in combination, housing means having an annular rim defining an opening, and a closure member fitting within said rim in closed position covering said opening, said rim flaring outwardly at a predetermined angle relative to the axis of said opening, and an annular sealing gasket arranged between the periphery of said closure member and said rim, said gasket being of compressible resilient material and being integrally formed of an inner portion in sealing engagement with the periphery of said closure member and an outer portion sloping outwardly at a greater angle than said predetermined angle and having at its outermost region a diameter larger than the inner diameter of said rim, said outer portion of said gasket being radially compressed between the periphery of said closure member and said flaring rim by wedging engagement therewith for forming an air-tight seal therewith.

2. A device as defined in claim 1, said rim being connected to said housing means by an annular flange extending transverse said axis, said outer gasket portion at its innermost region having a projecting portion engaging and compressed by said flange in the closed position of said closure member.

3. A device as defined in claim 1, said inner gasket portion formed integrally of outer, intermediate, and inner walls defining a channel receiving said closure member at its periphery, said outer gasket wall normally extending inwardly at an acute angle to said intermediate wall, whereby said outer gasket wall is urged in tight engagement with said closure member.

4. A device as defined in claim 3, the junction of said outer and intermediate gasket walls normally having a thickness substantially greater than the thickness of said walls.

5. A device as defined in claim 3, said closure member having a channel-shaped frame surrounding its periphery, the inner and outer portions of said gasket defining therebetween a channel complementary to and receiving said frame in sealing engagement therewith.

6. A device as defined in claim 2, said outer gasket portion at said outermost and innermost regions being substantially wedge-shaped in cross-section.

7. Closure sealing arrangement comprising, in combination, housing means having an annular rim defining an opening, and a closure member fitting within said rim in closed position covering said opening, said rim flaring outwardly at a predetermined angle relative to the axis of said opening, and an annular sealing gasket arranged between the periphery of said closure member and said rim, said gasket being of compressible resilient material and being integrally formed of an inner portion in sealing engagement with the periphery of said closure member and an outer portion sloping outwardly at a greater angle than said predetermined angle and having at its outermost region a diameter larger than the inner diameter of said rim, whereby said gasket is radially compressed by engagement with said rim for forming an air-tight seal therewith, said rim being connected to said housing means by an annular flange extending transverse said axis, said outer gasket portion at its innermost region having a projecting portion engaging and compressed by said flange in the closed position of said closure member, said outer gasket portion at said outermost and inner most regions being substantially wedge-shaped in cross-section and being hollow, said hollow wedge-shaped portions providing spaced collapsible seals around the periphery of said closure member.

8. A device as defined in claim 1, means hingedly connecting said closure member to said rim for movement of said closure member between said closed position and an open position away from said opening, and latch means for detachably securing said closure member to said housing means in closed position, said outer gasket portion slidably engaging said flaring rim with a wedging action during movement of said closure member to closed position.

9. A device as defined in claim 8, said rim being connected to said housing means by an annular flange extending transverse said axis, said outer gasket portion at its innermost region having a projecting portion engaging and compressed by said flange in the closed position of said closure member.

10. A sealing device comprising a gasket of compressible resilient material integrally formed of a generally S-shaped inner portion and an outer portion connected to the top of said S-shaped inner portion and having an outer sealing surface sloping downwardly and outwardly therefrom, said outer portion at top and bottom being wedge-shaped in cross section.

References Cited

UNITED STATES PATENTS

| 2,606,346 | 8/1952 | Hassell | 49—400 X |
| 2,626,434 | 1/1953 | Ike | 49—400 |
| 2,716,447 | 8/1955 | Adams et al. | 49—488 X |
| 2,778,070 | 1/1957 | Roger | 49—488 X |

KENNETH DOWNEY, Primary Examiner

U.S. Cl. X.R.

49—400, 488, 490, 495